US006608017B1

(12) United States Patent
Dihora et al.

(10) Patent No.: US 6,608,017 B1
(45) Date of Patent: Aug. 19, 2003

(54) ENCAPSULATED OIL PARTICLES

(75) Inventors: Jiten Odhavji Dihora, Cincinnati, OH (US); Benjamin Edgar Chapman, Cincinnati, OH (US)

(73) Assignee: Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/980,801

(22) PCT Filed: Jul. 14, 2000

(86) PCT No.: PCT/US00/19471
§ 371 (c)(1), (2), (4) Date: Dec. 3, 2001

(87) PCT Pub. No.: WO01/05926
PCT Pub. Date: Jan. 25, 2001

Related U.S. Application Data

(60) Provisional application No. 60/144,635, filed on Jul. 20, 1999, now abandoned.

(51) Int. Cl.$^7$ .......................... C11D 17/00; B32B 15/02
(52) U.S. Cl. ................ 510/349; 428/402.2; 428/402.4; 428/403; 524/47; 524/81; 524/801; 424/490; 510/101; 510/108; 510/129; 510/531
(58) Field of Search ........................... 428/402.2, 402.4, 428/403; 524/47, 81, 801; 424/490; 510/101, 108, 129, 349, 531

(56) References Cited

U.S. PATENT DOCUMENTS

| | | | |
|---|---|---|---|
| 3,576,760 A | | 4/1971 | Gould et al. |
| 3,936,537 A | | 2/1976 | Baskerville, Jr. et al. |
| 3,971,852 A | | 7/1976 | Brenner et al. |
| 4,209,417 A | | 6/1980 | Whyte |
| 4,339,356 A | | 7/1982 | Whyte |
| 5,324,444 A | * | 6/1994 | Berry et al. ................... 512/4 |
| 5,336,665 A | | 8/1994 | Garner-Gray et al. |
| 5,500,223 A | * | 3/1996 | Behan et al. ................ 424/451 |
| 5,798,433 A | | 8/1998 | Schmidt et al. ............. 528/279 |
| 5,840,668 A | * | 11/1998 | Behan et al. ................ 510/112 |
| 5,851,517 A | | 12/1998 | Mougin et al. |
| 5,905,067 A | * | 5/1999 | Chapman et al. ........... 510/368 |
| 5,990,070 A | * | 11/1999 | Chapman et al. ........... 510/349 |

FOREIGN PATENT DOCUMENTS

| | | | |
|---|---|---|---|
| EP | 0523287 | * | 1/1993 |
| EP | 0 523 287 A1 | | 1/1993 |
| EP | 0 684 301 A2 | | 11/1995 |
| EP | 0684301 | * | 11/1995 |
| EP | 0 852 912 A2 | | 7/1998 |
| EP | 0965326 | * | 12/1999 |
| EP | 0 965 326 A1 | | 12/1999 |
| GB | 2 311 296 A | | 9/1997 |
| JP | 61155307 A | | 7/1986 |
| JP | 61-155307 | | 7/1986 |
| WO | WO 99/00687 A1 | | 1/1999 |
| WO | WO 99/01029 A1 | | 1/1999 |

* cited by examiner

*Primary Examiner*—Samuel A. Acquah
(74) *Attorney, Agent, or Firm*—James F. McBride; Kim W. Zerby; Steve W. Miller

(57) ABSTRACT

Modified starch encapsulated oil particles, and a process for making said particles and products comprising such particles are disclosed. Such particles provide a simple, efficient and effective delivery system that can be used to deliver oils to compositions.

32 Claims, No Drawings

ENCAPSULATED OIL PARTICLES

CROSS REFERENCE TO RELATED APPLICATIONS

This application is a national stage entry under 35 U.S.C. §371 of PCT/US00/19471, filed Jul. 14, 2000, which claims the benefit of U.S. Provisional Application No. 60/144,635 filed Jul. 20, 1999, (now abandoned).

FIELD OF THE INVENTION

The present invention relates to an encapsulated oil particle comprising a water soluble polymer, an oil and a hydrophobic additive as well as a process for making the encapsulated particle. The encapsulating material is a water-soluble polymer which dissolves when the particle is diluted with or added to water, thereby releasing the oil. The particle is prepared by dehydrating an emulsion of the oil and the water soluble polymer.

BACKGROUND OF THE INVENTION

It is useful to encapsulate an oil in a water-soluble matrix to deliver an otherwise liquid material in a powder, paste or cream formulation. Encapsulated oil particles are used in powdered beverages, nutritional supplements, pharmaceutical preparations and particulate detergent compositions as well as for delivering scents into disposable articles such as baby diapers or sanitary napkins. Encapsulation can also enhance and prolong the functional characteristics of the encapsulated oils. Products containing oils that have been encapsulated are more easily packaged and retain their functional characteristics longer during storage because the encapsulated oil is protected from degradation by other ingredients in the compositions as well as from atmospheric degradation. Encapsulation is also used to provide sustained release of the oils encapsulated.

There has been a continuing search for methods and compositions which effectively and efficiently deliver oils into an aqueous medium, i.e. delivering a hydrophobic perfume oil to an aqueous laundry solution.

The choice of the encapsulation process for a specific application is based on parameters such as mean particle size required, physical/chemical properties of both the oil and the encapsulating matrix, desired release mechanism, industrial manufacturing scale envisioned, and the process cost. One such method for encapsulating hydrophobic materials is described in Applicants' co-pending application Ser. No. 09/980,801.

Hydrophobic silica has been used as a starting material in encapsulation processes. U.S. Pat. No. 5,500,223 to Behan et. al., provides a detailed discussion of using hydrophobic silica in a complex coacervation process whereby the silica is dispersed in water, active material is added, and a pH adjustment is followed by addition of a salt or cationic surfactant/polymer to gel the colloidal mixture.

Another method for delivery of perfume in the wash cycle involves combining the perfume with an emulsifier and water soluble polymer, forming the mixture into particles, and adding them to a laundry composition, as is described in U.S. Pat. 4,209,417, Whyte, issued Jun. 24, 1980; U.S. Pat. No. 4,339,356, Whyte, issued Jul. 13, 1982; and U.S. Pat. No. 3,576,760, Gould et al., issued Apr. 27, 1971. However, even with the substantial work done in the industry, a need still exists for a simple, more efficient and effective oil delivery system which can be used to deliver oils in dry compositions.

SUMMARY OF THE INVENTION

The present invention relates to an encapsulated oil particle comprising, a water soluble polymer, an oil, and an effective amount of a hydrophobic additive.

The present invention also relates to a process for manufacturing the above described encapsulated oil particle comprising the steps of dispersing an effective amount of a hydrophobic additive into an oil, emulsifying the dispersion into an aqueous solution of a water-soluble polymer, atomizing the emulsion, and dehydrating the atomized emulsion to form an encapsulated oil particle.

It is an object of the invention to provide an encapsulate with less oil present on the surface, increased encapsulation efficiency (increase in the amount of oil encapsulated) and increased physical stability of the encapsulated particle (minimum oil loss over time). It is a further object of the invention to provide increased product yield from the dehydration process (lower amount of product stuck to the wall of the drying chamber) and to increase the drying rate from the dehydration process without additional energy input into the system.

The invention also relates to compositions comprising encapsulated oils as herein described, such as powdered beverages, cosmetics, hair care compositions, foods (coffee, preservatives, colors, sweeteners, enzymes, antioxidants, cross-linking agents), pharmaceuticals (vitamins, drug delivery compositions), personal cleansing, dish wash, hard surface cleaners, parachemical industries (encapsulation of catalysts, release of batericidal agents, coloring agents), agrochemical industry (for release of pesticides), essential oils and fragrances (delayed release, prevention of chemical degradation, incorporation into dry systems, modulation of odor release), and especially granular detergents.

The present invention solves the long-standing need for a simple, cost effective, storage-stable oil delivery system. Further, encapsulated oil-containing compositions have reduced product odor during storage of the composition. The present invention also yields substantial monetary savings in the dehydration process.

All percentages, ratios, and proportions herein are on a weight basis unless otherwise indicated. All documents cited are hereby incorporated by reference in their entirety.

DETAILED DESCRIPTION OF THE INVENTION

This invention relates to an encapsulated oil particle comprising a) a water soluble polymer, b) an oil; and c) a hydrophobic additive. Such particles can be designed to enhance or prolong the functional characteristics of encapsulated oils. For example, substances naturally of a liquid character can be formulated into a powder, paste or cream formulation, more easily adapted for packaging or for practical utility, such as for sustained release of said compositions.

To prepare the encapsulated oil particle, the hydrophobic additive is first dispersed uniformly in the selected oil. The dispersion is then emulsified with the water-soluble polymer. The hydrophobic additive partitions to the interface between the oil and the polymer/water. Some of the hydrophobic additive remains dispersed in the oil droplets and an additional amount surrounds and coats the emulsified microscopic oil droplets within the aqueous polymer solution. The hydrophobic additive acts to repel water and water vapor, whereby internal mass transfer of water is increased to yield faster drying. Particle inflation or "ballooning" effects are reduced because particle temperature remains low to yield a more dense particle. Too much particle inflation leads to fracture of the encapsulate resulting in poor physical stability. When the atomized emulsion is dried, the hydrophobic additive coated oil droplets are encapsulated by the solidified polymer.

While not wishing to be bound by theory it is believed that the hydrophobic additive acts as a hydrophobic sink, decreasing the vapor pressure of the oil during drying so that the oil has less of a tendency to migrate toward the surface of the capsule where it could be subsequently evaporated during drying. Additionally, the addition of a hydrophobic additive increases the amount of energy necessary to draw the oil out of the particle. Typically, without direct addition of a hydrophobic additive, a dried capsule has surface oil amounting to approximately 2.0%. Surface oil is measured by extraction of the encapsulated particle with hexane at 25° C. and atmospheric pressure, followed by gas chromatography. The hexane extracts only the oil on the surface of the particle, not the oil encapsulated within the particle. With the direct addition of a hydrophobic additive to the oil, prior to emulsification with a water-soluble polymer and subsequent spray drying, surface oil of the resultant encapsulated oil particle is reduced to below 0.1%. Since the hydrophobic additive has very few internal pores, the diffusion of the oil from the interior of the capsule to the exterior of the capsule is forced to take place around the solid additive particle. This improves the physical stability of the particles. Improved physical stability relates to less oil loss over time from the encapsulated oil particle.

Lower surface oil can be achieved by addition of hydrophobic additives which act as either oil adsorbents or absorbents. Oil adsorbents adhere the oil to the surface of the hydrophobic additive whereas oil absorbents act to draw the oil into the additive particle much like a sponge. Improved physical stability and dehydration benefits are best achieved by the addition of hydrophobic additives which are primarily oil adsorbents, and have very little internal porosity. Additionally, hydrophobic additives that are adsorbents also provide the benefit of lower surface oil. From hereon, no distinction is made between additives which are oil adsorbents or absorbents; however, hydrophobic additives which are oil adsorbents are preferred.

Oil

The oil encapsulated by the present invention can be any oil that is a liquid between about 10° C. and 90° C. When used in laundry detergent compositions the preferred oils are perfume. Some suitable perfume oils are described in co-pending PCT Application Serial No. WO99/00687 and PCT Application Serial No. WO99/01028, incorporated herein by reference. When used in powdered beverages or other food products the preferred oils are flavor oils. Examples of some additional oils suitable for use according to the present invention are presented below in Table 1:

TABLE 1

| Oil | Possible Application |
| --- | --- |
| Vitamin E (Tocopheryl esters) | tablets and capsuled confectionery, chewing gum, instant drinks, foods (cakes, etc.) |
| Alcohols (wine, beverages containing saccharide, proteins, salts, etc.) | |
| Coffee extract | instant coffee |
| Surfactants | detergents |
| Vitamins (ascorbic acid, thiamine mononitrate, riboflavin, pyridoxine hydrochloride, niacinamide, calcium pantothenate, cyanocobalamin, di-alpha tocopheryl acetate, and the like) | Palatable compositions (vitamin tablets) |

Hydrophobic Additive

Hydrophobic additives for addition to the oil in order to achieve dehydration benefits and improved microencapsulate quality are water insoluble, able to be dispersed well in oil at a level of 0.1 to 10 wt % of the oil, have low internal porosity (void volume) and high specific surface area (maximum adsorption of oil occurs on the surface). To achieve adequate dispersion of the hydrophobic additive in the oil it is necessary that the selected hydrophobic additive also contain functional groups capable of interaction with the functional groups of the selected oil. For example, if the oil selected for encapsulation contains functional groups such as alcohol, nitrile, ester, ketone, sulfate or sulfonate groups, then the hydrophobic additive selected should also contain similar groups. If the oil selected is comprised largely of hydrocarbons then the hydrophobic additive should also contain an amount of hydrocarbon to allow dispersion of the additive in the oil. Additionally, the hydrophobic additives have a particle size less than 10 micrometers, preferably less than 1 micrometer, most preferably less than 0.1 micrometers.

Suitable hydrophobic additives are clays, bentonites, corn starch, hydrophobic starches, talcs, and other similar materials which meet the criteria specified. Other suitable hydrophobic additives include those described in U.S. Pat. No. 5,851,517 (Mougin), incorporated herein by reference. The hydrophobic additives can also be hydrophobic polymers can be radical polymers polycondensates, cross-linked, film forming, non-film forming, or polymers of natural origin. Highly cross-linked polymers or copolymers such as a polymethacrylate copolymer (POLYTRAP commercially available from Advanced Polymer Systems) are useful. A hydrophilic polymer meeting the aforementioned criteria required for benefits, whose surface has been rendered hydrophobic by surface treatments, may also be suitable. Such surface treatments include reaction with alkoxysilanes, silazanes, or siloxanes. Various treatments are available for polymers, including but not limited to plasma polymerization to hydrophobically modify polymer surfaces, and copolymerization with hydrophobic polymers. Hydrophobic materials such as nylon powders, polyethylene, and polypropylene are also suitable for use as additives to the oil.

A preferred hydrophobic additive is hydrophobic silica. Hydrophobic silicas ideal for use in accordance with the invention are derived from flame hydrolysis. The silanol surface is derivatized with various substituents which then make the silica hydrophobic. Examples of reactants used to derivatize the surface of the silica include, but are not limited to, halogen silanes, alkoxysilanes, silazanes, siloxanes, etc. The amorphous hydrophobic silicas have $SiO_4$ tetrahedrons randomly arranged, display short-term order, and form irregular chains. They have better dispersability than their hydrophilic counterparts due in part to their lower network structure. In addition to derivatization with different functional groups, the hydrophobic silicas can also be doped with aluminum compounds, or mixed with aluminum oxides for use with the oils in the dehydration process. Preferably, the particles have an average diameter less than about 100 nanometers, and usually are in the range of from about 7 to 40 nanometers. The particles have a large specific surface area, in the range of 50 to 380 m2/g.

One suitable hydrophobic silica, Aerosil R974 manufactured by Degussa, is made hydrophobic by methylating the silanol groups of fumed silica with dimethyl dichlorosilane. It has a particle size between 7 and 16 nanometers. Approximately 70 wt % of the surface silanol groups are derivatized and the average particle size is 16 nanometers. In addition to repelling water, hydrophobic silicas differ from hydrophilic silicas in having reduced water vapor absorption, and a reduced silanol group density.

The dispersibility of Aerosil R974, in several perfume oil raw materials, representing key functional groups, is illustrated below. The level of silica in each material was approximately 0.2 wt %. Table 2. below suggests the importance of matching the functional groups of the hydrophobic additive with the functional groups of the oil formulation in order to achieve a stable dispersion. The good dispersions below are identified by the clarity of the solutions(i.e. the dispersed particles are invisible to the eye), and the absence of a precipitate.

| Functionality | Perfume Raw Material | Level of dispersion after 24 hours at 25° C. |
|---|---|---|
| Nitrile | Geranyl Nitrile | Very good dispersion, no settling observed |
| | Citronellyl Nitrile | Very good dispersion, no settling observed |
| Ketone | Ionone AB | Very good dispersion, no settling observed |
| | Methyl Hexyl Ketone | Very good dispension, slight amount of precipitate observed |
| Alcohol | Eugenol | Very good dispersion, no settling observed |
| Ether | Para Cresyl Methyl Ether | Poor dispersion, settling of silica. Will disperse upon slight agitation, but settling is quick. |
| Ester | Ethyl 2-Methyl Butyrate | Adequate dispersion, some settling observed |
| | Hexyl Acetate | Adequate dispersion, some settling observed |
| | Frutene | Adequate dispersion, some settling observed |
| Aldehyde | Florhydral | Poor dispersion, viscous gel of silica. |
| | Hexylcinnamic aldehyde | Poor dispersion, viscous gel of silica. |
| Hydrocarbon | Habanolide 100% | Poor dispersion (silica somewhat dispersed due to high oil viscosity; however, large particles dispersed). |

Table 3. below illustrates the necessity for the oil to have at least 10% by weight functional groups in common with the hydrophobic additive to provide an adequate dispersion and achieve the benefits of the present invention. These results were obtained by combining an oil with a mixture of a functional groups most of which have little or no ability to disperse the silica with a small percentage of a functional group with an affinity for the hydrophobic additive. The data indicates that the minimum concentration of a common functional group to assure a good dispersion is about 10%.

TABLE 3

| Description | Composition | Level of Dispersion after 24 hours at 25° C. |
|---|---|---|
| Sample 1 (Hydrocarbon + Ketone) | Habanolide 90 wt % Ionone AB 10 wt % | Very good dispersion |
| Sample 2 (Aldehyde + Ketone) | Hexylcinnamic Aldehyde 90 wt % Ionone AB 10 wt % | 0.05 wt % good dispersion, increase to 0.2 wt % leads to precipitation. |

The optimum amount of hydrophobic additive necessary to achieve the benefits of the present invention is a function of the oil selected for encapsulation. The optimum level is also dependent on the encapsulating matrix, the ratio of encapsulating matrix to oil in the finished granular product, the completeness of dispersion of the hydrophobic additive in the oil, and the operating conditions during dehydration. For some oils the level of hydrophobic additive may be as high as about 10% by weight of the oil. Addition of amounts of silica in excess of 10% adversely affects the physical stability of the encapsulated oil particle. When very high levels of silica are used (greater than 10% by weight of oil) the excess silica becomes adjoined to the outside of the encapsulated oil particle as an agglomerate, leading to undesired benefits for encapsulates to be used for controlled delivery. The high hydrophobicity of the additive promotes diffusion of the encapsulated oil from the interior of the particle to the exterior, decreasing the capsules overall physical stability. When the oil is a perfume for use in a detergent composition, the level of hydrophobic additive is preferably about 3% or less by weight of the oil, more preferably from about 0.1% to about 1% by weight of the oil and most preferably from about 0.5% to about 1% by weight of the oil.

To achieve the desired benefits as described herein, the oil and the hydrophobic additive must form a dispersion. If a dispersion is not formed and the additive simply precipitates out of the oil and none of the described benefits will result. To determine if a dispersion is formed, samples of the selected oil and the hydrophobic additive at various levels of hydrophobic additive (preferably 0 wt %–1.0 wt %, incrementing by 0.1 wt %) are prepared. The samples are mixed well, and left to sit for a 24 hour period at 5° C. above the freezing point temperature of the oil. The samples are qualitatively assessed in order of increasing levels of hydrophobic additive noting the lowest level at which there is a solid precipitate. The level just above where a precipitate was first observed is selected for use. Density measurements are used to confirm that the hydrophobic additive is dispersed in the oil. A density increase indicates that the hydrophobic additive is dispersed in the oil. Attentively, spectrophotometric studies of absorbance or % transmittance can also be used to confirm a colloidal dispersion of the hydrophobic additive in the oil.

From this data the optimum level of hydrophobic additive is determined by conducting pilot dryer experiments. Oil-in-water emulsions of oil and water soluble polymer with various levels of hydrophobic additive added to the oil phase are prepared, making sure to maintain the feed solids constant in all solutions. The emulsions are dehydrated using any of the drying methods disclosed herein. Product yield, rate of emulsion dried and amount of dryer chamber coating are all recorded. The samples are then analyzed for total oil encapsulated. This is achieved by dispersing the particles first in hexane to extract the surface oil, followed by separate extraction with methanol to extract the encapsulated oil. The methanol extract is analyzed using a gas chromatograph. With the use of graphic representation of the collected data the data is analyzed to determine the level of hydrophobic additive which provides the optimum product yield, and rate of emulsion drying, the minimum quantity of product stuck on wall of drying chamber, the minimum surface oil of the encapsulate and the maximum physical stability of the encapsulate.

Water-Soluble Polymer

Water-soluble polymers suitable for use as encapsulating materials should have high water solubility, effective oil emulsification and film forming characteristics, and efficient drying properties. Suitable materials used to encapsulate oils according to the present invention include:

1. Carbohydrates (starch, maltodextrins, corn syrup solids, cyclodextrins, modified starch, or combinations/blends of these)
2. Cellulose esters and ethers (carboxy methyl cellulose, methyl cellulose, ethylcellulose)
3. Gums (gum acacia, agar, sodium alginate)
4. Lipids (wax, paraffin, fats, oils)
5. Proteins (gelatin, soy protein, whey protein)

Modified starch is preferred. Modified starches can be made from raw starch, pregelatinized starch, modified starch derived from tubers, legumes, cereal and grains, for example corn starch, wheat starch, rice starch, waxy corn starch, oat starch, cassava starch, waxy barley, waxy rice starch, sweet rice starch, amioca, potato starch, tapioca starch, oat starch, cassava starch, and mixtures thereof. Modified starches include, hydrolyzed starch, acid thinned starch, starch esters of long chain hydrocarbons, starch acetates, starch octenyl succinate, and mixtures thereof.

In accordance with the present invention raw microporous starch granules are partially hydrolyzed with alpha-amylase and/or glucoamylase and optionally treated chemically to modify structural integrity and surface characteristics. The amylase-treated granules have numerous pores leading from the granule surface to the granule interior giving the treated granules a sponge-like appearance on microscopic examination. Substances can be readily absorbed into the porous granular starch matrix.

The term "hydrolyzed starch" refers to oligosaccharide-type materials that are typically obtained by acid and/or enzymatic hydrolysis of starches, preferably corn starch. Suitable hydrolyzed starches include maltodextrins and corn syrup solids. The hydrolyzed starches have a Dextrose Equivalent (DE) values of from about 10 to about 36 DE. The DE value is a measure of the reducing equivalence of the hydrolyzed starch referenced to dextrose and expressed as a percent (on a dry basis). The higher the DE value, the more reducing sugars present. A method for determining DE values can be found in Standard Analytical Methods of the Member Companies of Corn Industries Research Foundation, 6th ed. Corn Refineries Association, Inc. Washington, D.C. 1980, D-52.

Starch esters having a degree of substitution in the range of from about 0.01% to about 10.0% are useful. The hydrocarbon part of the modifying ester should be from a $C_5$ to $C_{16}$ carbon chain. Preferably, octenylsuccinate (OSAN) substituted waxy corn starches of various types such as 1) waxy starch: acid thinned and OSAN substituted, 2) blend of corn syrup solids: waxy starch, OSAN substituted, and dextrinized, 3) waxy starch: OSAN substituted and dextrinized, 4) blend of corn syrup solids or maltodextrins with waxy starch: acid thinned OSAN substituted, and then cooked and spray dried, 5) waxy starch: acid thinned and OSAN substituted then cooked and spray dried, and 6) the high and low viscosities of the above modifications (based on the level of acid treatment) can also be used in the present invention.

Modified starches having emulsifying and emulsion stabilizing capacity such as starch octenyl succinates have the ability to entrap the oil droplets in the emulsion due to the hydrophobic character of the starch modifying agent. The oil remains trapped in the modified starch until the particle is dissolved in an aqueous solution such as a wash solution for a detergent or a beverage, due to thermodynamic factors i.e., hydrophobic interactions and stabilization of the emulsion because of steric hindrance. The particular aqueous solution will depend on the end use of the encapsulates.

Process

The present invention also relates to a process for manufacturing the above described encapsulated oil particle, the process comprising the steps of dispersing an effective amount of a hydrophobic additive into an oil, emulsifying the dispersion with an aqueous solution of a water-soluble polymer, atomizing the emulsion, and dehydrating the atomized emulsion to form an encapsulated oil particle.

This invention outlines novel manufacturing advantages resulting from the use of a hydrophobic additive in an oil-in-water emulsion formulation to be subsequently dehydrated to prepare a particulate product. Direct addition of a hydrophobic additive to an oil to be encapsulated, not only improves the encapsulate quality, it also provides significant process cost savings by increasing drying efficiency (reduces energy input) and increasing product yield (greater quantity of product collected, minimum amount of product coating the drying chamber) and reducing oil loss in the drying unit.

These improvements are applicable to dehydration processes such as rotary drying, horizontal vacuum rotary drying, drum drying, fluidized bed drying, microwave drying, dielectrical drying, spouted bed drying, impingement drying, flash drying or superheated steam drying and especially spray drying.

Spray drying is by definition the transformation of a feed from a liquid state (emulsion, dispersion, or paste) into a dried particulate form, achieved by spraying the liquid feed into a hot drying medium. It is a continuous or batch process consisting of several transformations including atomization, spray-air mixing, evaporation, and product separation. Pressure, centrifugal, and pneumatic are common atomization techniques.

The preparation of the emulsion to be dehydrated is a first step in encapsulation via spray drying. An oil-in-water emulsion is prepared such that the oil droplet size is less than 5 micrometers, preferably less than 1 micrometer, most preferably less than 0.5 micrometers. The small droplet size results in improved stability and less oil on the surface of the particle. The emulsion is transformed into droplets by atomization. Upon atomization of the liquid feed, hot air flowing counter-currently or co-currently contacts the atomized particles and evaporates the water. It is at this stage that volatile oil materials are lost most easily. Mass transfer operations control the rate of drying of the droplet. Upon the formation of the drop, loss of moisture is controlled by the gas phase resistance (constant rate drying period). The drop temperature is the wet bulb temperature of the drying air. As drying continues, a gradient in water concentration develops within the particle, initiating the falling rate period. Drying is rate limited by moisture transport within drops. Once a solid crust/skin has been formed, the droplet temperature begins to increase from the wet bulb toward the dry bulb temperature of the air; further diffusion of volatile oil is retarded by the solid material and tortuous pores or channels. At temperatures reaching or exceeding the boiling point of water, substantial particle inflation or "ballooning" occurs and deviations from a spherical particle shape begin to occur.

The present invention is a method which employs dehydration for producing a particulate product. The particulate product comprises an oil encapsulated in a water-soluble polymer. The invention achieves a lower surface concentration of the oil (which may be important in encapsulation of volatile oil materials), and improved efficiency of the dehydration process. An optimum amount of a hydrophobic additive is dispersed In the oil. The optimum amount is dependent on the oil and microencapsulate application as described above. The oil/additive dispersion is emulsified using an aqueous solution of a water-soluble polymer to yield an oil droplet size below 1 micrometer.

One suitable process for encapsulation of oil is by spray drying of the oil, silica and starch emulsion. First a starch is dissolved in water by agitating the mixture with an impeller rotating at 500 RPM for about 20 minutes. The starch is left to sit overnight for deareation and complete dispersion to yield a 33 wt % aqueous solution of starch. Alternatively, a pre-prepared liquid starch solution with a low level of biocide and/or defoamer can be used. Separately, a dispersion of oil and about 0.1–3.0 wt % hydrophobic silica is formed by gentle agitation of the mixture. This takes less than 5 minutes. Upon achieving a homogenous dispersion, the oivsilica mixture is added to the vortex of the starch solution, and agitated at 300 RPM for 10 minutes. The resultant emulsion is then ultrasonically mixed for 2–4 minutes. Alternate techniques for obtaining submicron emulsion droplet size are well known in the industry and can be employed here. The oil droplet size is preferably <1 micrometer. The emulsion is then spray dried by conventional spray drying methods using a co-current or counter-current tower and atomized through a spinning disk with co-current or counter-current airflow for drying. The emulsion is dried using an inlet air temperature of 185–200° C., and an outlet air temperature of 95–115° C. Following drying a flow aid such as Sipemat D10 is added at about 1.0%. Analysis of the finished encapsulated oil particle (all % based on weight):

| | |
|---|---|
| Total oil | 49.0% |
| Encapsulated oil | 48.0% |
| Free/Surface oil | 1.0% |
| Starch | 48.25% |
| Moisture | 1.5% |
| Hydrophobic Additive (in oil phase) | 0.25% |
| Flow Aid | 1.0% |

Other known methods of dehydration to manufacture the starch encapsulates of the present invention, include but are not limited to, rotary drying, horizontal vacuum rotary drying, drum drying, fluidized bed drying, microwave drying, dielectrical drying, spouted bed drying, impingement drying, flash drying, superheated steam drying, or spray freeze drying.

When the oils as described herein are perfume oils and used in detergent compositions they are normally added to water for use. Upon exposure to water, the water-soluble polymer begins to dissolve. Not wishing to be bound by theory it is believed that the dissolving matrix swells and an emulsion of perfume oil droplets, water-soluble polymer and water is formed, the water-soluble polymer being the emulsifier and emulsion stabilizer. After the emulsion is formed, the perfume oil begins to coalesce into larger droplets of oil, which can migrate to either the surface of the solution or to the surface of fabrics in the wash solution due to the relative density difference between the perfume droplets (mostly low density hydrophobic oils) and the wash water. When the droplets reach either interface, they spread out quickly along the surface or interface. The spreading of the perfume droplet at the wash surface increases the surface area from which the perfume oil can volatilize, thereby releasing larger amounts of the perfume into the headspace above the wash solution which is generally beneficial to consumers. This provides a surprisingly strong and consumer noticeable scent in the headspace above the wash solution. Furthermore, the interaction of the perfume droplets with wet fabrics in solution provides a surprisingly strong and consumer noticeable scent on fabrics.

Encapsulation of oils as described above allows for loading of larger amounts of oil than if they were encapsulated in a native starch granule. Absorption of oils using cyclodextrin is limited by the particle size of the guest molecule (oil) and the cavity of the host (cyclodextrin). Traditional cyclodextrin molecules trap the oil completely inside their cavity thereby limiting the size and amount of the oil encapsulated. It is difficult to load more than about 20% oil into a cyclodextrin particle. However, encapsulation with a starch that has been modified to have emulsion properties does not impose this limitation. Since the encapsulation in the present invention is achieved by entrapping oil droplets of less than 15 microns, preferably less than 5 microns and most preferably less than 2.5 microns in size, within a modified starch matrix, while the matrix is being formed by removal of water from the emulsion, more oil can be loaded based on the type, method and level of modification of the starch. Encapsulation with the modified starches described by this invention allows loads much greater than 20% oil.

Other suitable matrix materials and process details are disclosed in, e.g., U.S. Pat. No. 3,971,852, Brenner et al., issued Jul. 27, 1976, which is incorporated herein by reference.

Water soluble perfume microcapsules containing conventional, non-HIA perfume oils can be obtained commercially, e.g., as IN-CAP® from Polak's Frutal Works, Inc., Middletown, N.Y; and as Optilok System® encapsulated perfumes from Encapsulated Technology, Inc., Nyack, N.Y.

Granular Detergent Composition Containing Encapsulated Perfume

The encapsulated oil particles hereinbefore described can be used in both low density (below 550 grams/liter) and high density granular detergent compositions in which the density of the granule is at least 550 grams/liter or in a laundry detergent additive product. Such high density detergent compositions typically comprise from about 30% to about 90% of detersive surfactant.

The detergent compositions herein comprise from about 0.01% to 50% of the above described modified starch encapsulated oil particle. More preferably, the detergent compositions herein comprise from about 0.05% to 8.0% of the encapsulated oil particle, even more preferably from about 0.5% to 3.0%. Most preferably, the detergent compositions herein contain from about 0.05% to 1.0% of the encapsulated oil particle. The encapsulated oil particles preferably have size of from about 1 micron to about 1000 microns, more preferably from about 50 microns to about 500 microns.

The encapsulated oil particles are used in compositions with detersive ingredients, as follows.

Optional Detersive Adjuncts

As a preferred embodiment, the conventional detergent ingredients are selected from typical detergent composition components such as detersive surfactants and detersive builders. Optionally, the detergent ingredients can include one or more other detersive adjuncts or other materials for assisting or enhancing cleaning performance, treatment of the substrate to be cleaned, or to modify the aesthetics of the detergent composition. Usual detersive adjuncts of detergent compositions include the ingredients set forth in U.S. Pat. No. 3,936,537, Baskerville et al. and in Great Britain Patent Applicaton No. 9705617.0, Trinh et al., published Sep. 24, 1997. Such adjuncts are included in detergent compositions at their conventional art-established levels of use, generally from 0% to about 80% of the detergent ingredients, preferably from about 0.5% to about 20% and can include color speckles, suds boosters, suds suppressors, antitarnish and/or anticorrosion agents, soil-suspending agents, soil release agents, dyes, fillers, optical brighteners, germicides, alkalinity sources, hydrotropes, antioxidants, enzymes, enzyme stabilizing agents, solvents, solubilizing agents, chelating agents, clay soil removal/anti-redeposition agents, polymeric dispersing agents, processing aids, fabric softening components, static control agents, bleaching agents, bleaching activators, bleach stabilizers, etc.

Low density compositions can be prepared by standard spray- drying processes. Various means and equipment are available to prepare high density granular detergent compositions. Current commercial practice in the field employs spray-drying towers to manufacture granular laundry detergents which often have a density less than about 500 g/l. Accordingly, if spray drying is used as part of the overall process, the resulting spray-dried detergent particles must be further densified using the means and equipment described hereinafter. In the alternative, the formulator can eliminate spray-drying by using mixing, densifying and granulating equipment that is commercially available.

High speed mixer/densifiers can be used in the present process. For example, the device marketed under the trademark "Lodige CB30" Recycler comprises a static cylindrical mixing drum having a central rotating shaft with mixing/ cutting blades mounted thereon. Other such apparatus includes the devices marketed under the trademark "Shugi Granulator" and under the trademark "Drais K-TTP 80". Equipment such as that marketed under the trademark "Lodige KM600 Mixer" can be used for further densification.

In one mode of operation, the compositions are prepared and densified by passage through two mixer and densifier machines operating in sequence. Thus, the desired compositional ingredients can be admixed and passed through a Lodige mixture using residence times of 0.1 to 1.0 minute then passed through a second Lodige mixer using residence times of 1 minute to 5 minutes.

In another mode, an aqueous slurry comprising the desired formulation ingredients is sprayed into a fluidized bed of particulate surfactants. The resulting particles can be further densified by passage through a Lodige apparatus, as noted above. The perfume delivery particles are admixed with the detergent composition in the Lodige apparatus.

The final density of the particles herein can be measured by a variety of simple techniques, which typically involve dispensing a quantity of the granular detergent into a container of known volume, measuring the weight of detergent and reporting the density in gramspiter.

Once the low or high density granular detergent "base" composition is prepared, the encapsulated perfume particles of this invention are added thereto by any suitable dry-mixing operation.

Deposition of Perfume onto Fabric Surfaces

The method of washing fabrics and depositing perfume thereto comprises contacting said fabrics with an aqueous wash liquor comprising at least about 100 ppm of conventional detersive ingredients described hereinabove, as well as at least about 0.1 ppm of the above-disclosed encapsulated perfume particles. Preferably, the aqueous liquor comprises from about 500 ppm to about 20,000 ppm of the conventional detersive ingredients and from about 10 ppm to about 200 ppm of the encapsulated perfume particles.

The encapsulated perfume particles work under all wash conditions, but they are particularly useful for providing odor benefits to the wet laundry solution during use and on dried fabrics during their storage.

EXAMPLES

The following nonlimiting examples illustrate the parameters of and compositions employed within the invention. All percentages, parts and ratios are by weight unless otherwise indicated.

Preparation of Aqueous Starch Solution 252 g of PPE 1388 modified starch (National Starch & Chemical Company) is dissolved in 467 g water by agitating the mixture at 500 RPM for about 20 minutes (Janke & Kunkel Model RW20DZMS1 with 3-blade agitator). The starch is left to sit overnight for deareation and complete solubilization to yield a 33 wt % aqueous solution of starch.

Reference Example 1

Hydrophobic silica is added at a level of 0.17 wt % and 0.50 wt % of the starch solution prepared above. After agitation at 300 RPM for 10 minutes, the silica is pulled into the solution and emulsified by the starch. The emulsion is then spray dried using a Yamato Model GB-21 dryer (5.0 inch diameter, height 20 inches) and atomized with air using a two-fluid Spraying Systems nozzle (40100 SS, 1153-120SS) with co-current airflow for drying. The emulsion is dried using an inlet air temperature of 190° C., and an outlet air temperature of 95° C. No drying benefits are observed (see Table 4). The product yield, production rate, and chamber coating are identical to that observed when no silica is added. (Example 1 spray dried).

TALE 4

| Description of Matrix | Level of Aerosil R974 (wt %) | Drying Rate[1] (g/min emulsion) | Wall Coating[2] (wt %) | Product Yield[3] (%) |
|---|---|---|---|---|
| Starch Solution | 0.0% | 9.75 | 41% | 44% |
| Starch Solution | 0.17% of starch | 9.75 | 42% | 45% |
| Starch Solution | 0.50% of starch | 10.0 | 53% | 38% |
| Starch Solution + Oil A | 0.0% | 12.5 | 22% | 60% |
| (Starch Solution + Aerosil R974) + Oil A | 0.17% of starch | 12.5 | 29% | 58% |
| Starch Solution + (Aerosil R974 + Oil A) | 0.50% of Oil A | 14.1 | 30% | 58% |

[1]Rate = Total emulsion dried/time required to dry
[2]Wall Coating = Qty of product on dryer chamber wall/Total product expected from run (based on qty emulsion dried)
[3]Yield = Qty product collected/Total product expected from run (based on qty emulsion dried)

Example 1

A dispersion of 80 g of a perfume oil and Aerosil R974 hydrophobic fumed silica from Degussa (exact oil/silica formulation given in Table 5) is formed by gentle agitation of the mixture. Upon achieving a homogenous dispersion, the oil/silica mixture is added to the vortex of the starch solution as prepared above, and agitated at 300 RPM for 10 minutes. The resultant emulsion is then ultrasonically mixed for 4 minutes (Heat Systems Sonicator Model XL2020). The emulsion is then spray dried using a Yamato Model GB-21 dryer (5.0 inch diameter, height 20 inches) and atomized using a two-fluid Spraying Systems nozzle (40100 SS, 1153-120SS) with co-current airflow for drying. The emulsion is dried using an inlet air temperature of 190° C., and an outlet temperature of 95° C. Results are summarized in Table 5.

TABLE 5

| Oil | Level of Silica (wt % of oil) | Free/Surface Oil ** (wt %) | Oil Loss* (wt %) |
|---|---|---|---|
| OIL B | 0 wt % | 0.50 wt % | 2.89% |
| OIL B | 4 wt % | 0.0058 wt % | 6.50% |
| OIL C | 0 wt % | 0.24 wt % | 7.98% |
| OIL C | 1 wt % | 0.038 wt % | 8.7% |
| OIL C | 2 wt % | 0.0041 wt % | 9.3% |

*oil loss = (oil lost after 10 days at 120 F./30% RH in 4 mil heat sealed LDPE polybags)/(initial oil)
** Free oil measured by hexane extraction The spray dried encapsulates are analyzed for total oil encapsulated, free/surface oil; samples are also placed into stressed storage stability to characterize the physical stability of the matrix. The physical stability data is presented in the last column of Table 5.

Example 2

A dispersion of 80 g perfume oil A and Aerosil R974 hydrophobic fumed silica from Degussa (exact oil/silica formulation given in Table 5) is formed by gentle agitation of the mixture. Upon achieving a homogenous dispersion, the oil/silica mixture is added to the vortex of the starch solution as prepared above, and agitated at 300 RPM for 10 minutes. The resultant emulsion is then ultrasonically mixed for 4 minutes (Heat Systems Sonicator Model XL2020). The emulsion is then spray dried using a Yamato Model GB-21 dryer (5.0 inch diameter, height 20 inches) and atomized using a two-fluid Spraying Systems nozzle (40100 SS, 1153-120SS) with co-current airflow for drying. The emulsion is dried using an inlet air temperature of 190° C., and an outlet temperature of 95° C. The drying rate, product yield, and total emulsion dried are closely monitored Results are summarized in Table 6.

TABLE 6

| Hydrophobic Silica | Level (wt % of oil) | Drying Rate[1] (g/min emulsion) | Wall Coating[2] (wt %) | Product Yield[3] (%) |
|---|---|---|---|---|
| Reference | 0.0% | 10.4 | 35% | 51% |
| Aerosil R974 | 0.25% | 10.5 | 26% | 57% |
| Aerosil R974 | 0.50% | 14.1 | 30% | 56% |
| Aerosil R974 | 0.75% | 14.2 | 30% | 54% |

[1]Rate = Total emulsion dried/time required to dry
[2]Wall Coating = Qty of product on dryer chamber wall/Total product expected from run (based on qty emulsion dried)
[3]Yield = Qty product collected/Total product expected from run (based on qty emulsion dried)

The spray dried encapsulates are analyzed for total oil encapsulated, free/surface oil; sample are also placed into stressed storage stability to characterize the physical stability of the matrix. The physical stability data is presented in the last column of Table 7.

TABLE 7

| OIL | Level of Silica (wt % of oil) | Total Oil Encapsulated (wt %) | Free/Surface Oil (wt %) | Oil Loss** (wt %) |
|---|---|---|---|---|
| OIL A | 0 wt % | 22.60% | 0.11% | 2.7% |
| OIL A | 0.25 wt % | 22.30% | 0.11% | 2.6% |
| OIL A | 0.50 wt % | 22.00% | 0.11% | 2.6% |
| OIL A | 0.75 wt % | 21.00% | 0.13% | 1.7% |

*oil loss = (oil lost after 10 days at 120 F./30% RH in 4 mil heat sealed LDPE polybags)/(initial oil)
**Free oil measured by hexane extraction

Example 3

A dispersion of 80 g perfume oil A and Sipemat D11 hydrophobic precipitated silica (exact oil/silica formulation given in Table 8) is formed by gentle agitation of the mixture. Upon achieving a homogenous dispersion, the oil/silica mixture is added to the vortex of the starch solution as prepared above, and agitated at 300 RPM for 10 minutes. The resultant emulsion is then ultrasonically mixed for 4 minutes (Heat Systems Sonicator Model XL2020). The emulsion is then spray dried using a Yamato Model GB-21 dryer (5.0 inch diameter, height 20 inches) and atomized using a two-fluid Spraying Systems nozzle (40100 SS, 1153-120SS) with co-current airflow for drying. The emulsion is dried using an inlet air temperature of 190° C., and an outlet temperature of 95° C. The drying rate, product yield, and total emulsion dried are closely monitored. Results are summarized in Table 8.

TABLE 8

| Hydrophobic Silica | Level (wt % of oil) | Drying Rate[1] (g/min emulsion) | Wall Coating[2] (wt %) | Product Yield[3] (%) |
|---|---|---|---|---|
| Reference | 0.0% | 9.8 | 24% | 70% |
| SIP D11 | 0.25% | 8.4 | 26% | 62% |
| SIP D11 | 0.50% | 8.6 | 18% | 68% |
| SIP D11 | 0.75% | 9.2 | 14% | 68% |

[1]Rate = Total emulsion dried/time required to dry
[2]Wall Coating = Qty of product on dryer chamber wall/Total product expected from run (based on qty emulsion dried)
[3]Yield = Qty product collected/Total product expected from run (based on qty emulsion dried)

The spray dried encapsulates are analyzed for total oil encapsulated, free/surface oil; sample are also placed into stressed storage stability to characterize the physical stability of the matrix. The physical stability data is presented in Table 9.

TABLE 9

| Perfume Oil | Level of Silica (wt % of oil) | Total Oil Encapsulated (wt %) | Free/Surface Oil** (wt %) | Oil Loss* (wt %) |
|---|---|---|---|---|
| OIL A | 0 wt % | 22.83% | 0.13% | 5.7% |
| OIL A | 0.25 wt % | 22.92% | 0.15% | 5.7% |
| OIL A | 0.50 wt % | 22.87% | 0.17% | 5.0% |
| OIL A | 0.75 wt % | 22.95% | 0.19% | 5.9% |

*oil loss = (oil lost after 10 days at 120 F./30% RH in 4 mil heat sealed LDPE polybags)/(initial oil)
**Free oil measured by hexane extraction

Example 4

187 Liters (213 kg) of starch solution as prepared above, with 0.15% (vol/vol) Tektamer 38 LV (biocide) is added to a 1000 L blend tank with a two blade agitator. 71 kg of perfume oil A is added to the vortex, and the mixture is agitated for 20 minutes at 300 RPM. The emulsion is then homogenized using a Stork Homogenizer at a pressure of 200 Bar. The emulsion is then spray dried using a 7 ft co-current dryer with a 152 mm spinning disk at RPMs as indicated in Table 10. Tremendous benefits in dehydration efficiency seen at the pilot scale (up to 40% increase in capacity) are confirmed on a larger tower (1.4 × to 2.0× increase in production rate with the same energy input). A 50 wt % feed solids emulsion is dried with an inlet air temperature of 205° C., an outlet temperature of 100° C.

TABLE 10

| Hydrophobic Silica Level (wt % of oil) | Disk Speed (RPM) | Production Rate Expected* (kg/hr) | Product Temperature (° C.) |
|---|---|---|---|
| 0% | 16100 | 80 | 46.1 |
| 0.5% | 16100 | 142 | 49.6 |

*at 19° C., shear rate of 9.7 sec$^{-1}$

The increase in product temperature is an indication that further energy savings can be realized (emulsion flow rate into the dryer can be increased further without increasing drying capacity).

What is claimed is:

1. An encapsulated oil particle comprising:
   a) a water soluble polymer;
   b) an oil; and
   c) a hydrophobically modified silica having a particle size greater than 100 nm;
   wherein the amount of hydrophobic silica is less than or equal to 10% by weight, of said oil.

2. A particle according to claim 1 wherein said amount of hydrophobic silica is less than or equal to 3% by weight, of said oil.

3. A particle according to claim 2 wherein said amount of hydrophobic silica is less than or equal to 1% by weight, of said oil.

4. A particle according to claim 3 wherein said amount of hydrophobic silica is less than or equal to 0.5% by weight, of said oil.

5. A particle according to claim 4 wherein said amount of hydrophobic silica is less than or equal to 0.1% by weight, of said oil.

6. A particle according to claim 1 wherein said hydrophobic silica has a particle size of less than 5 microns but greater than 100 nm.

7. A particle according to claim 6 wherein said hydrophobic silica has a particle size of less than 1 micron but greater than 100 nm.

8. A particle according to claim 1 wherein said oil is a liquid at a temperature of from 10° C. to 90° C.

9. A particle according to claim 1 wherein said oil is a perfume raw material.

10. An encapsulated oil particle comprising:
    a) a water soluble polymer wherein said water soluble polymer is a starch which has been modified by treatment with octenylsuccinic acid anhydride;
    b) an oil; and
    c) a hydrophobically modified silica;
    wherein the amount of hydrophobic silica is less than or equal to 10% by weight, of said oil.

11. An encapsulated oil particle comprising:
    a) a water soluble polymer;
    b) an oil admixture; and
    c) a compatible hydrophobic additive admixture,
    wherein said oil admixture and said hydrophobic additive admixture each comprise at least 10% by weight, of an ingredient which is either a hydrocarbon or which comprises a compound having a similar functional unit, said functional unit selected from the group consisting of hydroxyl, aldehyde, nitrile, ester, ketone, ether, sulfate, sulfonate, and mixtures thereof.

12. A particle according to claim 11 wherein said amount of hydrophobic additive admixture is less than or equal to 3% by weight, of said oil admixture.

13. A particle according to claim 12 wherein said amount of hydrophobic additive admixture is less than or equal to 1% by weight, of said oil admixture.

14. A particle according to claim 13 wherein said amount of hydrophobic additive admixture is less than or equal to 0.5% by weight, of said oil admixture.

15. A particle according to claim 14 wherein said amount of hydrophobic additive admixture is less than or equal to 0.1% by weight, of said oil admixture.

16. A particle according to claim 11 wherein said hydrophobic additive admixture has a particle size of less than 5 microns.

17. A particle according to claim 16 wherein said hydrophobic additive admixture has a particle size of less than 1 micron.

18. A particle according to claim 17 wherein said hydrophobic additive admixture has a particle size of less than 0.1 micron.

19. A particle according to claim 11 wherein said oil is a perfume raw material.

20. An encapsulated oil particle comprising:
    a) a water soluble polymer wherein said water soluble polymer is a starch which has been modified by treatment with octenylsuccinic acid anhydride;
    b) an oil admixture; and
    c) a compatible hydrophobic additive admixture;
    wherein said oil admixture and said hydrophobic additive admixture each comprise at least 10% by weight of an ingredient which is either a hydrocarbon or which comprises a compound having a similar functional unit, said functional unit selected from the group consisting of hydroxyl, aldehyde, nitrile, ester, ketone, ether, sulfate, sulfonate, and mixtures thereof.

21. A granular cleaning composition comprising:
    a) from 0.01% to 50% by weight, of an encapsulated oil particle according to claim 1; and
    b) from 50% to 99.99% by weight of an ingredient selected from the group consisting of surfactants, builders, bleaching agents, enzymes, soil release polymers, dye transfer inhibitors, fillers, and mixtures thereof.

22. An encapsulated oil particle comprising:
    a) a water soluble polymer;
    b) an oil; and
    c) a hydrophobically modified silica;
    wherein the ratio of oil to hydrophobically modified silica is greater than 100:1.

23. A particle according to claim 22 wherein the ratio of oil to hydrophobically modified silica is greater than 200:1.

24. A particle according to claim 23 wherein the ratio of oil to hydrophobically modified silica is greater than 1000:1.

25. A particle according to claim 22 wherein said hydrophobic silica has a particle size of less than 5 microns.

26. A particle according to claim 25 wherein said hydrophobic silica has a particle size of less than 1 micron.

27. A particle according to claim 26 wherein said hydrophobic silica has a particle size of less than 0.1 micron.

28. A particle according to claim 22 wherein said oil is a liquid at a temperature of from 10° C. to 90° C.

29. A particle according to claim 22 wherein said oil is a perfume raw material.

30. An encapsulated oil particle comprising:
    a) a water soluble polymer wherein said water soluble polymer is a starch which has been modified by treatment with octenylsuccinic acid anhydride;
    b) an oil; and c) a hydrophobically modified silica;
wherein the ratio of oil to hydrophobically modified silica is greater than 100: 1.

31. An encapsulated oil particle comprising:
   a) a water soluble polymer comprising a starch that has been modified by treatment with octenylsuccinic acid anhydride;
   b) an oil; and.
   c) a hydrophobically modified silica;
wherein the amount of hydrophobic silica is less than or equal to 10% by weight, of said oil.

32. A granular cleaning composition comprising:
   a) from 0.01% to 50% by weight, of an encapsulated oil particle according to claim 22; and
   b) from 50% to 99.99% by weight of an ingredient selected from the group consisting of surfactants, builders, bleaching agents, enzymes, soil release polymers, dye transfer inhibitors, fillers, and mixtures thereof.

* * * * *